US008825555B2

(12) United States Patent
Gross et al.

(10) Patent No.: US 8,825,555 B2
(45) Date of Patent: Sep. 2, 2014

(54) PRIVACY-SENSITIVE SAMPLE ANALYSIS (75) Inventors: Thomas R. Gross, Zurich (CH); Erich M. Ruetsche, Pfaeffikon (CH)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 13/173,634

(22) Filed: Jun. 30, 2011

(65) Prior Publication Data
US 2012/0005098 A1    Jan. 5, 2012

(30) Foreign Application Priority Data

Jun. 30, 2010 (EP) .................................. 10168023

(51) Int. Cl.
*G06Q 20/00* (2012.01)
*G06Q 20/38* (2012.01)

(52) U.S. Cl.
CPC .................................. *G06Q 20/383* (2013.01)
USPC .......... 705/74; 705/2; 705/3; 705/50; 705/67; 702/19; 702/20; 702/21

(58) Field of Classification Search
USPC ...................... 705/2, 3, 50, 67, 74; 702/19–21
See application file for complete search history.

(56) References Cited

U.S. PATENT DOCUMENTS

| 5,509,064 | A | * | 4/1996 | Welner et al. ............ 379/265.02 |
| 5,612,870 | A | * | 3/1997 | Welner .............................. 705/3 |
| 5,926,526 | A | * | 7/1999 | Rapaport et al. ........... 379/88.25 |
| 5,978,466 | A | * | 11/1999 | Quattrocchi ............. 379/265.01 |
| 7,222,362 | B1 | * | 5/2007 | Canetti et al. ....................... 726/5 |
| 8,281,131 | B2 | * | 10/2012 | Camenisch et al. .......... 713/168 |
| 2002/0055176 | A1 | * | 5/2002 | Ray ................................. 436/67 |
| 2002/0059030 | A1 | * | 5/2002 | Otworth et al. ................. 702/19 |
| 2003/0073124 | A1 | * | 4/2003 | Bowman et al. ................. 435/6 |
| 2003/0148365 | A1 | * | 8/2003 | Morgan ............................ 435/6 |
| 2003/0217037 | A1 | * | 11/2003 | Bicker et al. ..................... 707/1 |
| 2004/0014097 | A1 | * | 1/2004 | McGlennen et al. ............ 435/6 |
| 2005/0059034 | A1 | * | 3/2005 | Tyler et al. ....................... 435/6 |

(Continued)

OTHER PUBLICATIONS

Patrik Bichsel et al., "Cryptographic Protocols of the Identity Mixer Library", Copyrighted by IBM 2008.*

(Continued)

*Primary Examiner* — Steven Kim
(74) *Attorney, Agent, or Firm* — Gail H. Zarick; Otterstedt, Ellenbogen & Kammer, LLP (57) ABSTRACT

Processes are described for provision of privacy-sensitive sample analysis results to a sample provider. The sample provider generates a cryptographic commitment encoding a secret value, r, and a sample identifier, s, associated with a sample container. The sample provider provides the commitment to an analysis provider in association with the sample container containing a sample for analysis. The analysis provider analyzes the sample to obtain a set of analysis results corresponding to the sample identifier, s, and generates a cryptographic pre-credential, σ', corresponding to the sample identifier, s. The pre-credential, σ', encodes the set of analysis results and the commitment. Completion of the pre-credential, σ', requires knowledge of the secret value, r, in the commitment. In response to cryptographic proof of knowledge by the sample provider of at least the secret value, r, in the commitment encoded in the pre-credential, σ', corresponding to the sample identifier, s, the analysis provider supplies the pre-credential, σ', to the sample provider. The sample provider then completes the pre-credential, σ' using the secret value, r, to obtain a cryptographic credential, σ, encoding the set of analysis results.

10 Claims, 3 Drawing Sheets

(56) References Cited

U.S. PATENT DOCUMENTS

| | | | |
|---|---|---|---|
| 2005/0075543 A1* | 4/2005 | Calabrese | 600/300 |
| 2008/0195326 A1* | 8/2008 | Munzer et al. | 702/20 |
| 2010/0063837 A1* | 3/2010 | Bellante et al. | 705/2 |
| 2010/0115281 A1 | 5/2010 | Camenisch et al. | |
| 2010/0142704 A1* | 6/2010 | Camenisch et al. | 380/44 |
| 2010/0191975 A1* | 7/2010 | Chase et al. | 713/176 |
| 2010/0251351 A1* | 9/2010 | Teranishi | 726/7 |
| 2010/0293113 A1* | 11/2010 | Munzer et al. | 705/500 |

OTHER PUBLICATIONS

Rui Wang, et al. "Privacy-Preserving Genomic Computation Through Program Specialization". CCS'09, Nov. 9-13, 2009, Chicago, Illinois, USA.

Jan Camenisch, et al. "Cryptographic Protocols of the Identity Mixer Library", v1.0, IBM Research Report No. RZ3730, Mar. 19, 2009.

* cited by examiner

PRIVACY-SENSITIVE SAMPLE ANALYSIS

CROSS-REFERENCE TO RELATED APPLICATION(S)

This application claims foreign priority to EPO Patent application 10168023.9 filed Jun. 30, 2010, the complete disclosure of which is expressly incorporated herein by reference in its entirety for all purposes.

FIELD OF THE INVENTION

This invention relates generally to privacy-sensitive sample analysis, and more particularly to provision of privacy-sensitive sample analysis results to a sample provider.

BACKGROUND OF THE INVENTION

In systems where samples are sent for analysis to an analysis provider who then returns the results to the sample provider, privacy and security can be important considerations. For example, in analysis of biological samples such as genetic material provided by an individual, ensuring that results remain confidential, and that the individual's privacy is protected, may be especially important. Consider, for instance, sample analysis to determine aspects of an individual's genetic make-up. The following description will focus on this type of application as providing a particularly poignant example of a situation where privacy and security are critical. It should be understood, however, that the techniques to be described may also be applied in other privacy-sensitive sample analysis scenarios.

Genetic analysis may be performed for various purposes in medical environments, and may also be offered as a service to consumers who wish to obtain information about their genetic make-up, e.g. information about their genotype and phenotype. Currently, multiple companies offer gene analysis to end users as a service. A typical mode of operation is that the user pays in advance and obtains a salivary test kit. For example, the user may register with a web-site of the analysis provider and pay on-line, giving a mailing address for the test kit. The user then sends a salivary sample to the analysis provider. Following analysis of the sample, the results are communicated to the user. For example, the user might be given access to the results via the service provider's web site in response to input of a pre-arranged password.

Advances in genome sequencing technology mean that genetic analysis is expected to become more efficient and cost effective. The extent of the genetic data that can reasonably be provided via such services is likely to expand accordingly. For the cost of obtaining only a few genome indicators (e.g. a few health markers) using current technology, it is feasible that developing technologies will offer much more extensive genome analysis, and even a full genome sequence. This is clearly very sensitive private data, and proper handling of this data is of the utmost importance. Genetic analysis services may be subject to government regulations on privacy protection, such as the Privacy Act of 2005 and the Genetic Information Nondiscrimination Act of 2008 in the United States, as well as customer demands for proper handling of their private data. Ensuring confidentiality of the analysis results is critical, so that results cannot be accessed by unauthorized parties. The linking of genetic data to an actual identity of a user, e.g. a mailing address or e-mail address, is also highly controversial as the possibility of misuse of such personal information has serious implications. These issues are relevant to analysis service providers and also analysis facilities used by service providers The risk of privacy and security violations is aggravated by the basic procedures involved in the overall analysis process. In the case of Internet-based, commercial analysis operations for instance, a user first needs to obtain a sampling kit. This is usually ordered to the user's postal address, and requires payment which is usually by credit card or bank transfer. The final results are usually obtained by on-line review of a named user account. These information flows and procedures introduce a linking of a user's true identity to the analysis results and impose severe privacy and security risks. For example, the risk of unauthorised access to the user's results is highly dependent on the security imposed on user accounts by the service provider, and there is always a risk of malicious intervention to circumvent such procedures, allowing access to results without user consent. Similar considerations also apply to analyses for medical organizations where a patient's genetic data, for example, is requested by a medical practitioner from an analysis service provider. The process usually requires some identification of the user, usually linked to an insurance or payer organization, and the risk of unauthorized access to the analysis results is again severe. For genetic analysis in particular, the implications of availability of genetic data are deeply significant, and the need for effective privacy protection is extreme. The topic of strong privacy and genetic analysis has been addressed to some extent in "Privacy-Preserving Genomic Computation Through Program Specialization", Reiter et al., ACM Conference on Computer and Communications Security 2009, 338-347. In general, however, current proposals for privacy protection in analysis processes only leverage normal post exchanges, passwords, and perhaps electronic signatures for normal authentication of message senders.

SUMMARY OF THE INVENTION

One embodiment of an aspect of the present invention provides a process for provision of privacy-sensitive sample analysis results to a sample provider. The process comprises:
at the sample provider
  generating a cryptographic commitment encoding a secret value (r) of the sample provider and a sample identifier (s) associated with a sample container, and
  providing the commitment to an analysis provider in association with said sample container containing a sample for analysis;
at the analysis provider
  analyzing the sample to obtain a set of analysis results corresponding to said sample identifier (s),
  generating a cryptographic pre-credential, encoding the set of analysis results and said commitment, corresponding to said sample identifier (s) such that completion of the pre-credential requires knowledge of said secret value (r) in the commitment, and
  in response to cryptographic proof of knowledge by the sample provider of at least said secret value (r) in the commitment encoded in the pre-credential corresponding to said sample identifier (s), supplying the pre-credential to the sample provider; and
at the sample provider, completing the pre-credential using said secret value (r) to obtain a cryptographic credential encoding said set of analysis results.

In embodiments of this invention, the analysis results for a sample are encoded in a cryptographic credential. The credential is provided to the sample provider in a manner which ensures that only the original sample provider can use the credential. In addition, the sample provider can be sure that the credential relates to the correct sample originally supplied to the analysis provider. All this is achieved without requiring the identity of the sample provider to be revealed or even linked to the analysis results.

Cryptographic credentials are well known and widely used in cryptography-based applications to certify information which may need to be subsequently proved by a user. Typical applications include government or electronic ID cards which encode identity or other security-sensitive information. The credential holder can then use the credential to make proofs to a verifying party, via various cryptographic proof protocols, about information encoded in the credential. Information can be encoded in cryptographic credentials in a variety of ways, and the structure of such credentials, and the associated cryptographic protocols, need not be addressed in detail here. It suffices to understand that a cryptographic credential is essentially a certificate generated via a cryptographic process by an issuing party to confirm validity of the information encoded in the credential. In embodiments of this invention, a cryptographic credential is used to encode the analysis results for a sample submitted by a sample provider. In particular, the analysis provider generates a cryptographic pre-credential encoding the set of analysis results. Pre-credentials are also well known in the cryptography field and have been employed in IBM's Identity Mixer anonymous credential system (see, for example, "Efficient non-transferable anonymous multi-show credential system with optional anonymity revocation", J. Camenisch and A. Lysyanskaya, in B. Plitzmann, editor. Advances in Cryptology—EUROCRYPT 2001, volume 2045 of Lecture Notes in Computer Science, pages 93-118, Springer Verlag. 2001, and "Cryptographic Protocols of the Identity Mixer Library", v1.0, IBM Research Report No. RZ3730, 19 Mar. 2009. A pre-credential is essentially an incomplete, and in this form unusable, credential which can be completed to obtain a usable credential via a cryptographic process. To successfully complete the credential, the party performing the completion process must include a predetermined element in the credential. Hence, if this element is a secret value originally provided in a cryptographic commitment by the intended user of the credential, the system provides a mechanism for ensuring that only the intended user can complete the pre-credential and so use the resulting, complete credential.

Embodiments of the present invention exploit pre-credentials as one component of an overall sample analysis procedure which provides privacy and security for a sample provider's analysis results. In particular, the sample provider generates a cryptographic commitment which encodes both a secret (and ideally random) value r of the sample provider and also a sample identifier s which is associated with a sample container used to contain the sample to be analyzed. (The concept of commitment is fundamental to cryptography applications, and involves use of a cryptographic function to generate a cryptographic value (the "commitment") which encodes a value (or values) to which the provider wants to commit. Cryptographic proofs of knowledge (proofs of representation) can then be made about the value in the commitment without revealing the value itself. The commitment is perfectly hiding (meaning that it will leak no information about the encoded value) and computationally binding (meaning that bounded computational resources ensure the prover cannot cheat on the encoded value)). The commitment on the secret value r and sample identifier s is provided to the analysis provider in association with the sample container. Following analysis of the sample, the analysis provider generates a pre-credential corresponding to the sample identifier s. This pre-credential encodes the set of analysis results and also the commitment corresponding to the sample identifier s. The pre-credential is such that completion of the pre-credential as discussed above requires knowledge of the secret value r. This step already ensures that only the original sample provider, to whom the value r is secret, will be able to complete, and hence make use of, the credential. In addition, however, in order to receive the pre-credential from the analysis provider, the sample provider must prove knowledge of (at least) the secret value r in the commitment encoded in the pre-credential corresponding to a sample identifier s. For example, the sample provider can apply to the analysis provider for the pre-credential corresponding to the sample identifier s for his sample, but the pre-credential will only be released to him on proof of knowledge of the correct secret value r. In this way, the analysis provider need not know the identity of the sample provider but can still be assured that only the true sample provider can receive the pre-credential encoding his analysis results. The sample provider can then simply complete the pre-credential using the secret value r to obtain a usable cryptographic credential encoding his analysis results.

It will be seen that provision of sample analysis results as described above not only provides the sample provider with a cryptographic credential for his results, with consequent further benefits discussed below, but privacy and security are provided in that only the true sample provider can obtain and make further use of the credential, while the analysis provider need only know the sample identifier s and not the actual identity of the sample provider. In addition, because the sample identifier s is bound to the secret value r in the commitment, the sample provider can be sure that he receives the credential for the correct results (corresponding to the sample identifier s for the original sample container), and a malicious party who steals either the sample container or the associated commitment cannot use this in the process described to obtain results for his own purposes. Consent of the sample provider to obtaining the credential for his results is therefore also ensured. As will be demonstrated below, embodiments of the invention can provide complete end-to-end privacy protection coupled with full anonymity for the sample provider and unlinkability of sample results to a user identity. Preferred embodiments also may offer additional advantageous features as will be described hereinafter.

Scenarios can be envisaged in which receipt of the credential encoding the sample results may be sufficient for the sample provider's purposes. For enhanced utility, however, preferred embodiments include the steps of:

at the analysis provider, generating a cryptographic encryption encoding the set of analysis results using a public key corresponding to a secret key of the sample provider, and supplying said encryption to the sample provider with the pre-credential; and at the sample provider, decoding the encryption using said secret key to obtain the set of analysis results.

In these preferred embodiments, therefore, in addition to the credential encoding his results, the sample provider also obtains the sample results in unencoded form. This allows far greater flexibility in use of the credential, allowing a wide range of cryptographic proofs to be performed about the results encoded in the credential, and in particular allows proofs to be made about particular results without revealing the results themselves. For example, in preferred embodiments the credential supplied to the user is a so-called "anonymous credential". Anonymous credentials are well known in cryptography. These credentials and their associated cryptographic protocols permit "zero-knowledge" proofs to be made which do not reveal any other information to a verifier than that which is to be proved. These features provide the basis for exceptionally high levels of privacy to be maintained in subsequent use of the credential.

In general, where a cryptographic item is indicated herein as encoding a particular element, that item may also encode one or more other elements. Similarly, a cryptographic proof indicated as proving a particular fact herein may additionally involve proving one or more further facts. Additional cryptographic processes and proofs may also be employed at various stages in embodiments of the invention to enhance security and privacy of the overall process. Examples will be detailed below.

The "sample provider" and "analysis provider" as used herein may in general comprise One or more persons, devices, systems or other entities such as companies or organizations. In a typical scenario, for example, the sample provider might be a user providing the sample to be analyzed and using dedicated cryptography software running on a computing device, such as a personal computer, to perform the necessary cryptographic processes. As another example, the sample provider may comprise one or more persons in a medical organization providing a sample for a patient, again employing computing facilities for cryptographic procedures. In the following, the sample provider may be referred to as "the user" for simplicity, though no loss of generality is intended unless the context requires otherwise. The analysis provider may similarly comprise one or more persons, devices, systems or other entities such as companies or organizations. Again, one or more computing devices can implement the various cryptographic procedures performed by the analysis provider. In particularly preferred embodiments, the analysis provider will comprise two entities, referred to herein as an "analysis service provider" and an "analyzer", which are operated independently of one another. This will be explained in detail below.

The secret value r is assumed to be a value which is known only to the sample provider (and possibly associated authorized parties) and, in particular, is not disclosed to the analysis provider. The secret value r is ideally a random value, being selected at random by the sample provider from some set of values. This secret value is encoded in the commitment along with the sample identifier s associated with the sample container containing the sample to be analyzed. The sample identifier s might simply be marked on the sample container in any convenient manner which enables the identifier s to be read (whether by man or machine). In preferred embodiments, however, unlinkability of the sample identifier and a user's identity is facilitated by the sample container being provided with a hidden sample identifier which can be made readable by the user providing the sample. For example, the sample identifier might be hidden under a scratch pad which is scratched away by the user to reveal the underlying sample identifier. This allows the sample identifier to be used in the subsequent analysis process without any link to a user identity. In particular, such a mechanism allows a user to receive a sample container at his mailing address without linking of the sample identifier to that address. This is more convenient than alternative scenarios, such as anonymous collection points for sample containers, which might be envisaged to ensure unlinkability here.

The commitment on the secret value r and sample identifier s is communicated to the analysis provider in association with the sample container, i.e. in such a manner that the association between sample container and commitment is apparent to the analysis provider. Conveniently, the commitment (on some form of readable information carrier such as a data storage device or bar-code for example) is simply securely attached to the sample container. The sample container and associated commitment can then simply be mailed or otherwise conveyed to the analysis provider. Alternatives, albeit less preferable, can be envisaged here, however. For instance, the commitment could be communicated separately of the sample container, e.g. transmitted electronically, identifying with the commitment the sample identifier s for the container with which the commitment is associated.

The set of analysis results for a sample may in general comprise one or more results. In particular applications such as genetic analysis, there may be numerous results corresponding, for instance, to various genetic data indicative of genetic make-up (e.g. genotype and/or phenotype) of the sample provider. The genetic data might even provide a full genome sequence for an individual as discussed above. For efficiency generally, and especially for extensive results, preferred embodiments employ a credential system in which individual results are encoded in the credential as the product of prime numbers corresponding to respective results. This will be explained in more detail below.

In preferred embodiments the commitment generated by the sample provider additionally encodes a private key (usually called the "master key") of the sample provider. (This private key can conveniently be the aforementioned secret key used for decoding the encrypted analysis results). The private key may be that encoded in one or more other credentials held by the sample provider, e.g. an identity credential encoding identity data of the sample provider. This allows the credential encoding the sample results to be bound to the additional credential(s), permitting cryptographic proofs to be made accordingly. For example, as discussed in more detail below, binding the results credential to an identity credential in this way provides the basis for strengthening user consent constraints in the sample analysis process.

A second aspect of the invention provides a process for obtaining privacy-sensitive sample analysis results from an analysis provider. The process comprises:

generating a cryptographic commitment encoding a secret value (r) of a sample provider and a sample identifier (s) associated with a sample container;

providing the commitment, in association with said sample container containing a sample for analysis, to the analysis provider for analyzing the sample to obtain a set of analysis results corresponding to said sample identifier (s), the analysis provider generating a cryptographic pre-credential, encoding the set of analysis results and said commitment, corresponding to said sample identifier (s) such that completion of the pre-credential requires knowledge of said secret value (r) in the commitment;

demonstrating to the analysis provider cryptographic proof of knowledge of at least said secret value (r) in the commitment encoded in said pre-credential corresponding to the sample identifier (s) and, in response, receiving the pre-credential from the analysis provider; and completing the pre-credential using said secret value (r) to obtain a cryptographic credential encoding said set of analysis results.

A third aspect of the invention provides a process for provision of privacy-sensitive sample analysis results to a sample provider. The process comprises:

receiving from the sample provider a sample container, associated with a sample identifier (s), containing a sample for analysis;

receiving from the sample provider, in association with said sample container, a cryptographic commitment encoding a secret value (r) of the sample provider and said sample identifier (s);

analyzing the sample to obtain a set of analysis results corresponding to said sample identifier (s);

generating a cryptographic pre-credential, encoding the set of analysis results and said commitment, corresponding to said sample identifier (s) such that completion of the pre-credential requires knowledge of said secret value (r) in the commitment; and in response to cryptographic proof of knowledge by the sample provider of at least said secret value (r) in the commitment encoded in the pre-credential corresponding to the sample identifier (s), supplying the pre-credential to the sample provider.

A fourth aspect of the invention provides a process for provision of privacy-sensitive sample analysis results to a sample provider. The process comprises:

receiving from the sample provider a sample container, associated with a sample identifier (s), containing a sample for analysis;

receiving from the sample provider, in association with said sample container, a cryptographic commitment encoding a secret value (r) of the sample provider and said sample identifier (s);

providing the commitment, in association with said sample container, to an analyzer for analyzing the sample to obtain a set of analysis results corresponding to said sample identifier (s);

receiving from the analyzer a cryptographic pre-credential, encoding the set of analysis results and said commitment, corresponding to said sample identifier (s) such that completion of the pre-credential requires knowledge of said secret value (r) in the commitment;

in response to cryptographic proof of knowledge by the sample provider of at least said secret value (r) in the commitment encoded in the pre-credential corresponding to the sample identifier (s), supplying the pre-credential to the sample provider.

A fifth aspect of the invention provides a process for provision of privacy-sensitive sample analysis results to an analysis service provider. The process comprises:

receiving from the analysis service provider a sample container, associated with a sample identifier (s), containing a sample for analysis;

receiving from the analysis service provider, in association with said sample container, a cryptographic commitment encoding a secret value (r) of a sample provider and said sample identifier (s);

analyzing the sample to obtain a set of analysis results corresponding to said sample identifier (s);

generating a cryptographic pre-credential, encoding the set of analysis results and said commitment, corresponding to said sample identifier (s) such that completion of the pre-credential requires knowledge of said secret value (r) in the commitment; and supplying the pre-credential corresponding to said sample identifier (s) to the analysis service provider.

In general, where features are described herein with reference to an embodiment of one aspect of the invention, corresponding features may be provided in embodiments of another aspect of the invention.

BRIEF DESCRIPTION OF THE DRAWINGS

Preferred embodiments of the invention will now be described, by way of example, with reference to the accompanying drawings in which.

DETAILED DESCRIPTION OF PREFERRED EMBODIMENTS

The process to be described for provision of sample analysis results uses various cryptographic techniques to enforce privacy and security. In particular, the process of this preferred embodiment makes use of an anonymous credential system based on Camenisch-Lysyanskaya signatures. Camenisch-Lysyanskaya signatures are described in detail in: "A Signature Scheme with Efficient Protocols", J. Camenisch and A. Lysyanskaya, in S. Cimato. C. Galdi and G. Persiano editors, Security in Communications Networks, Third International Conference, SCN 2002, volume 2576 of Lecture Notes in Computer Science, pages 268-289, Springer Verlag, 2003; and "Efficient non-transferable anonymous multi-show credential system with optional anonymity revocation", J. Camenisch and A. Lysyanskaya, referenced in full earlier. A brief description of the properties of Camenisch-Lysyanskaya signatures is given below to assist understanding of the embodiments to be described.

Assumptions

Strong RSA Assumption (See A method for obtaining Digital Signatures and public-key Cryptosystems, R. L. Rivest, A. Shamir, L. Adleman, Communications of the ACM, 21(2):120-126. February 1978.): given an RSA modulus n and a random element $g \chi Z^*_n$, it is hard to compute $h \chi Z^*_n$ and integer $e>1$ such that $h^e \equiv g \mod n$. The modulus n is of a special form pq, where $p=2p'-1$ and $q=2q'+1$ are safe primes.

Integer Commitments

We recall the Pederson commitment scheme (as detailed in "Non-interactive and Information-theoretic Secure Verifiable Secret Sharing", I. P. Pedersen, in J. Feigenbaum, editor. Advances in Cryptology—CRYPTO '91, volume 576 of Lecture Notes in Computer Science, pages 129-140, Springer Verlag, 1992) in which the public parameters are a group G of prime order q, and generators $(g_0, \ldots, g_m)$. In order to commit to the values $(v_0, v_m) \chi Z_q$, pick a random $r \chi Z_q$ and set $C=Com(v_0, v_m; r)=g_0^r \Pi_{i=1}^m g_1^{v_1}$.

Damgård and Fujisaki ("An integer commitment scheme based on groups with hidden order". I. Damgård and E. Fujisaki, http://eprint.iacr.org/2001, 2001) show that if the group G is an RSA group and the committer is not privy to the factorization of the modulus, then in fact the Pedersen commitment scheme can be used to commit to integers of arbitrary size.

Discrete-Logarithm-Based, Zero-Knowledge Proofs

The Camenisch-Lysyanskaya signature scheme makes use of several known results for proving statements about discrete logarithms. When referring to such proofs herein, we follow the notation introduced by Camenisch and Stadler ("Efficient Group Signature Schemes for Large Groups", J. Camenisch and M. Stadler, in B. Kaliski, editor, Advances in Cryptology—CRYPTO '97, volume 1296 of Lecture Notes in Computer Science, pages 410-424, Springer Verlag, 1997) for various proofs of knowledge of discrete logarithms and proofs of the validity of statements about discrete logarithms. For instance.

$$PK\{(\alpha,\beta,\delta): y = g^\alpha h^\beta \cdot \tilde{y} = \tilde{g}^\alpha \tilde{h}^\beta \cdot (u/\alpha/v)\}$$

denotes a "zero-knowledge Proof of Knowledge of integers $\alpha$, $\beta$, and $\delta$ such that $y=g^\alpha h^\beta$ and $\tilde{y}=\tilde{g}^\alpha \tilde{h}^\beta$ holds, where u[α[v and where y, g, h, $\tilde{y}$, $\tilde{g}$, $\tilde{h}$ are elements of some groups $G=\langle g \rangle = \langle h \rangle$ and $G=\rangle g \rangle = \langle h \rangle$. The convention is that Greek letters denote quantities of which knowledge is being proved, while all other values are known to the verifier. Such proofs of knowledge are typically implemented via an interactive process involving a series of communications between the prover and verifier. However, the Fiat-Shamir heuristic ("How to prove yourself: Practical solutions to identification and signature problems", A. Fiat and A. Shamir, in A. M. Odlyzko, editor, Advances in Cryptology—CRYPTO '86, volume 263 of Lecture Notes in Computer Science, pages 186-194. Springer Verlag, 1987) can be applied to turn such proofs of knowledge into signatures on some message m; denoted as, for example. $SPK\{(\alpha): y=g^\alpha\}(m)$. In this way, the prover's participation in the proof process is effectively condensed into a cryptographic function (the "signature proof of knowledge" (SPK)) for communication to the verifier. The verifier can use the signature proof of knowledge to complete proof without further interaction with the prover. Given a protocol in the foregoing notation in the following description, the derivation of an actual protocol implementing the proof will be apparent to those skilled in the art.

Camenisch-Lysyanskaya Signatures

We present here a minor and straightforward variant of the Camenisch-Lysyanskaya (CL) signatures discussed in "A Signature Scheme with Efficient Protocols" (referenced in full above) which allows messages to be negative integers as well. Let $1_m$, $1_e$, $1_n$, $1_r$ and L be system parameters ($1_r$ is a security parameter, and the meanings of the others will become apparent in the following).

Key generation: on input $1_n$, choose an $1_n$-bit RSA modulus n such that n=pq, p=2p'+1, q=2q'+1, where p, q, p', and q' are primes. Choose, uniformly at random, $R_0, \ldots, R_{L-1}, S, Z \chi$ ORn. Output the public key $(n, R_0, R_{L-1}, S, Z)$ and the secret key p.

Message space is the set $\{(m_0, \ldots, m_{L-1})\colon m_1 \chi \{0,1\}^{1_m}\}$.

Signing algorithm: on input $m_0, m_{L-1}$, choose a random prime number e of length $1_e > 1_m - 2$, and a random number v of length $1_v = 1_n + 1_m + 1_r$, where $1_r$ is a security parameter. Compute $$A = \left(\frac{Z}{R_0^{m_0} \ldots R_{L-1}^{m_{L-1}} S_v}\right)^{\frac{1}{e}} \bmod n.$$

The signature consists of (e, A, v).

Verification algorithm: to verify that the tuple (e, A, v) is a signature on message $(m_0, \ldots, m_{L-1})$, check that $Z \equiv A^e R_0^{m_0} \ldots R_{L-1}^{m_{L-1}} S^v \pmod{n}$, $m_i \in \pm\{0,1\}^{1_m}$ and $2^{1_e} > e > 2^{1_e-1}$ holds.

Proving Knowledge of a Signature: a prover can prove possession of a CL signature without revealing any other information about the signature. If A was a public value, we could do so by proving knowledge representation of Z with respect to $R_0, R_{L-1}, S$ and A. However, making A public would destroy privacy as that would make all transactions linkable. Luckily, one can randomize A: given a signature (A, e, v), the tuple (A':=$AS^{-r}$ mod n, e, v':=v+er) is also a valid signature as well. Now, provided that $A \chi \langle S \rangle$ and that r is chosen uniformly at random from $\{0,1\}^{l_n+l_\phi}$ the value is distributed statistically close to uniform over $Z_n^*$. Thus, the user could compute a fresh A' each time, reveal it and then run the protocols $$PK\{(\epsilon, v', \mu): Z \equiv \pm R_0^{\mu_0} \ldots R_{L-1}^{\mu_{L-1}} A^\epsilon S^{v'} \pmod{n} \\ \wedge \mu_i \in \pm \{0,1\}^{l_m} \wedge \epsilon \in [2^{l_e-1}+1, 2^{l_e}-1]\}$$

Now, there is a technical consequence from this proof protocol regarding the statements $\mu_i \in \pm\{0,1\}^{l_m} \wedge \epsilon \in [2^{l_e-1}+1, 2^{l_e}-1]$. While these can be implemented virtually for free, they require that the actual secret lie in a smaller interval, i.e. the signer needs to choose e from $[2^{l_e-1}-2^{l'_e}+1, 2^{l_e-1}+2^{l'_e}-1]$ with $l'_e < l_e - l_\phi - l_H - 3$ where $l_\phi$ and $l_H$ are security parameters (the first controlling statistical zero-knowledge and the second being the size of the challenge message in the PK protocol). Similarly, we require $m_i \in \pm\{0,1\}^{l_m - l_\phi - l_H - 2}$ when input to the signature scheme.

The CL Credential System and Attributes

The CL credential system can be used to encode attributes into credentials as follows. In the CL system, each user has a secret identity, i.e. a single secret key $s_U$. A credential issuing party now uses the CL signature scheme to sign the user's secret key as well as all attributes the issuer wants to assert about the user. This signing is of course done in a "blind" way such the issuer does not learn the user's secret key. Thus, the user will have obtained a signature (A, e, v) such that $Z \equiv \pm R_0^{s_U} R_1^{a_1} \ldots R_{L-1}^{a_{L-1}} A^\epsilon S^v \pmod{n}$ holds where $a_1, \ldots, a_{L-1}$ are the attested attributes and $(Z, R_0, \ldots, R_{L-1}, S, n)$ are the issuer's public key. A user can show that she obtained a credential from some issuer and selectively reveal some of the attributes (or prove statements about them) using the proof of knowledge of a signature described above.

Figure 1:
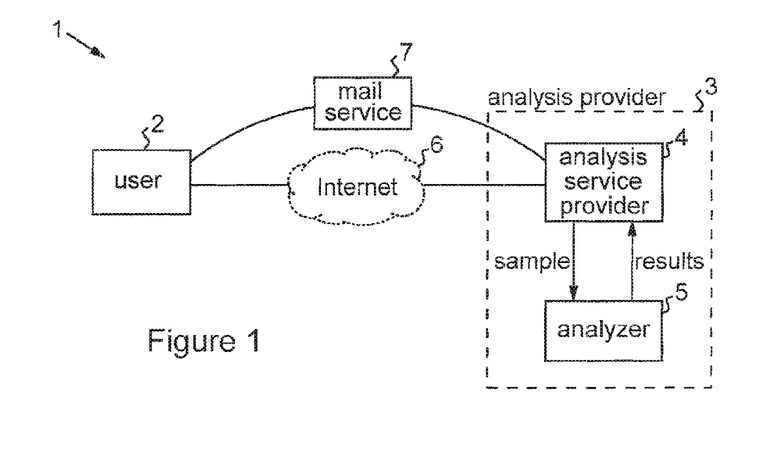
FIG. 1 is a schematic representation of a system for implementing a sample analysis procedure embodying the invention.

FIG. 1 shows an exemplary system 1 for implementing a sample analysis procedure embodying the invention. The particular procedure to be described is implemented in the context of an Internet-based genetic analysis service. The key parties in the system are represented schematically by blocks in the figure. These include a user 2, assumed here to be an individual wishing to obtain personal genetic information in conjunction with a user computer for performing various cryptographic and communications functions to be described. An analysis provider, indicated generally at 3, consists of two distinct entities in this embodiment, namely an analysis service provider 4 and an analyzer 5. Analysis service provider 4 represents a company running a web site offering genetic analysis services to users who can connect to the service provider's web server via the Internet, indicated at 6. Analyzer 5 represents a company for performing genetic analysis of samples to provide analysis results comprising genetic data indicative of genetic make-up of the samples. Service provider 4 and analyzer 5 are independent companies in this preferred embodiment for enhanced privacy and security in the procedure to be described. Like user 2, service provider 4 and analyzer 5 employ appropriate computing facilities for the necessary cryptographic procedures. In addition to electronic communications via Internet 6, the user 2 and service provider 4 also communicate via mail as indicated schematically by mail service block 7 in the figure.

The first stage of the overall sample analysis process in system 1 involves preparation and submission of the sample to be analyzed. The interaction between user 2 and analysis service provider 4 during this stage will be described with reference to FIG. 2. This figure indicates the key steps performed by the user 2 on the left of the figure and the analysis service provider 4 on the right. In numbered step (1) in the figure, the user connects via Internet 6 to the service provider's web site and requests a genetic sample kit. This involves the user making upfront payment for the analysis service and providing a mailing address for the sample kit. In step (2), service provider 4 mails a sample kit to the address provided. The kit contains a sample container which has a hidden sample identifier s which can be made readable by the user. In this example, the sample identifier s is marked on the sample container under a scratch pad. Thus, service provider 4 does not know the sample identifier s for the container supplied to the user so there is no link between the user's identity (mailing address, IP address, etc.) and the sample identifier s. Moreover, for maximum security in this preferred embodiment, the sample identifier s is assumed to be a random number which is unique to that sample container. There is therefore no possibility of the service provider predicting the sample identifier associated with any particular container.

Figure 2:
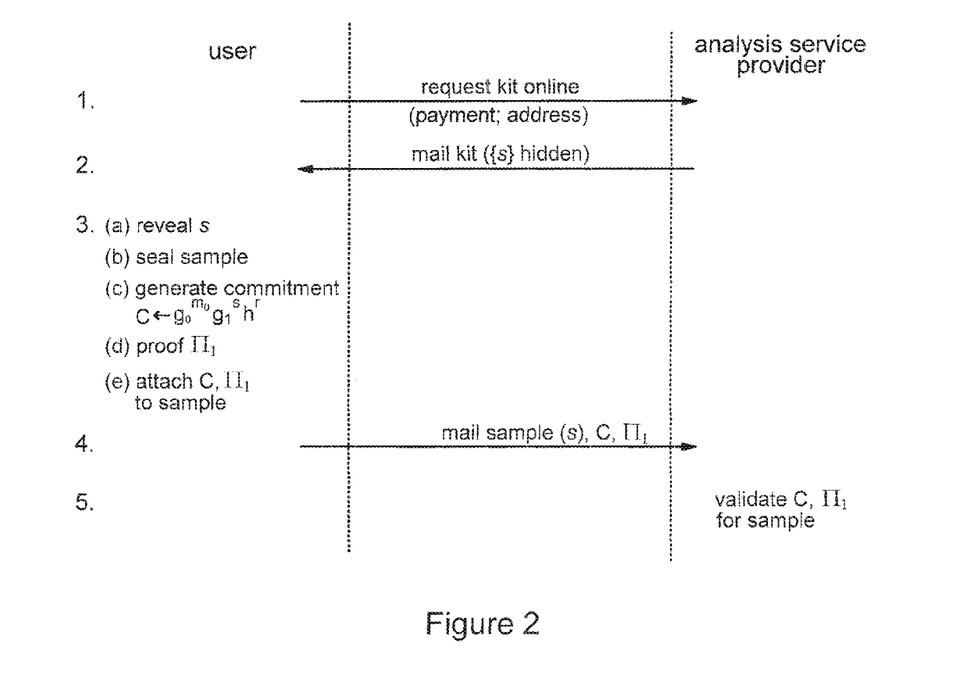
FIG. 2 illustrates interaction between a user and an analysis service provider for submission of a sample in the FIG. 1 system.

The sample kit is received by the user in step (3) of FIG. 2. The user checks the integrity of the scratch pad to ensure that the sample identifier has not been revealed. If the scratch pad is not in tact, the process is compromised and the user must request another kit. Assuming the pad is in tact, in step 3(a) the user removes the pad to reveal the sample identifier s. Once revealed, the sample identifier s is readable by the user or by electronic means, e.g. some form of scanner, whereby the value of s can be input to the user computer. The user computer is programmed with appropriate software, e.g. obtained from service provider 4 in step (1) or supplied with the test kit, for implementing the cryptographic operations to be performed by the user and described in the following. In step 3(b), the user places the sample in the sample container provided and securely seals the sample container. In step 3(c), the user cryptographically commits to the sample identifier s, his secret master key $m_0$, and a secret random number r. In particular, the user generates a commitment $C \rho\ g_0^{m_0} g_1^s h^r$ where $g_0$, $g_1$ and h are chosen uniformly at random from the set of quadratic residues $QR_n$, where n is a composite strong RSA modulus with the following properties: n has length $l_n$, n=pq, p=2p'+1 and q=2q'+1, where p, q, p' and q' are primes, and belongs to the analysis provider's public key. Next, in step 3(d), the user signature proves knowledge of the representation of commitment C (and by that knowledge of the master key $m_0$, the secret value r and the sample identifier s in the commitment). In particular, user 2 generates a signature proof of knowledge:

$$v_1 \rho SPK\{(m_0, s, r): C = g_0^{m_0} g_1^s h^r\} \pmod{n}.$$

In step 3(e), the commitment C and proof $v_1$ are serialized by the user computer, in this example as a 2-dimensional bar-code which is securely attached to the sample container. In step (4) the user then mails the sealed sample container back to service provider 4 anonymously, i.e. without indicating a sender address.

On receipt of the sample container in step (5) of FIG. 2, the service provider cryptographically validates the sample identifier s which is now readable on the container. Specifically, service provider 4 de-serializes and verifies the proof $v_1$ for the commitment C to confirm knowledge by the user of the master key $m_0$, secret value r and sample identifier s encoded in the commitment and to confirm equality of the sample identifier s in the commitment and that read from the sample container. The service provider thereby confirms that the sample is a genuine sample of the user who nonetheless remains anonymous.

Figure 3:
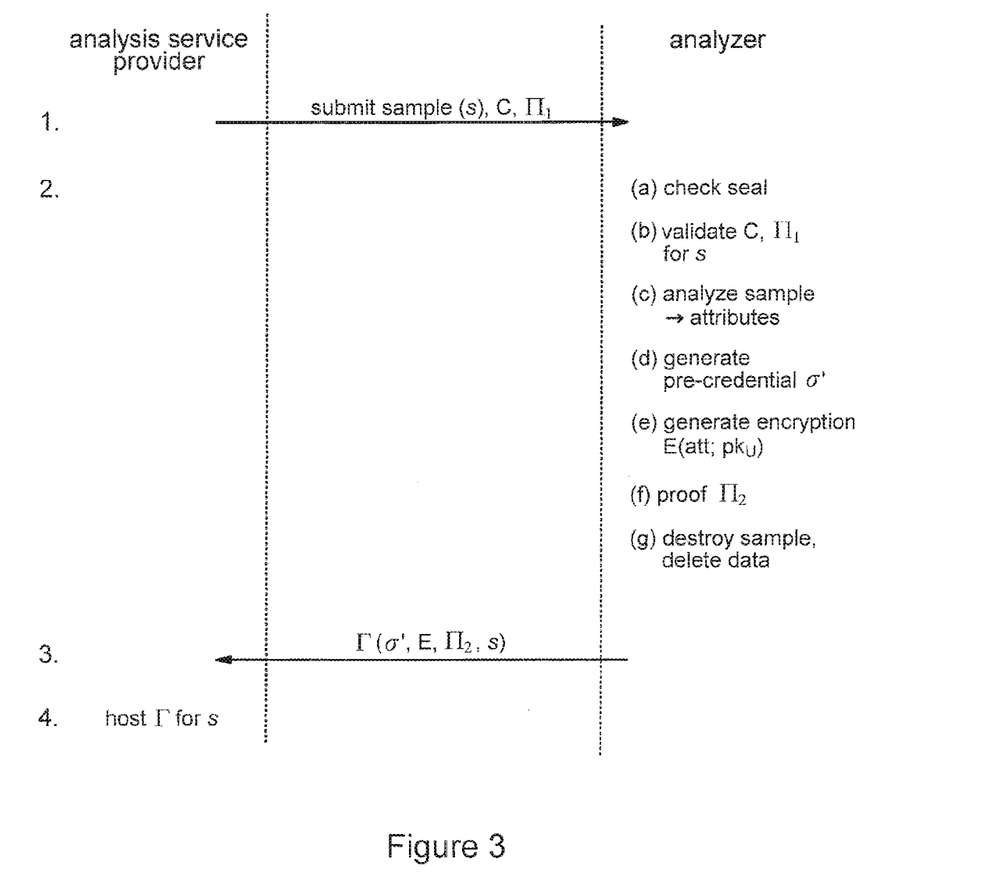
FIG. 3 illustrates interaction between the analysis service provider and an analyzer for procuring analysis results in the FIG. 1 system.

The next stage of the analysis process 1 involves procurement of the analysis results by service provider 4. FIG. 3 indicates the interaction during this stage between service provider 4 on the left of the figure and analyzer 5 on the right. In step (1) of this figure, service provider 4 submits the sealed sample container to analyzer 5. The sample identifier s, commitment C and proof $v_1$ remain readable on the sample container. In step 2(a), the analyzer first checks that the container seal is in tact. If not, security is compromised. In this case, analyzer 4 records all information for audit-trail purposes and notifies service provider 4 of the failure. If the seal is in tact, in step 2(b) the analyzer 5 de-serializes and validates the commitment C and signature proof of knowledge $v_1$ for the sample as in step (5) of FIG. 2. If invalid, the analyser 5 again creates an audit trail and the process fail-stops. If valid, analyser 5 opens the seal and analyzes the genetic sample.

The results of the analysis performed in step 3(c) are represented by a set of attributes $\{m_i | 1 \le i \le N\}$. In particular, each attribute in the set represents a respective predefined test result, and the value assigned to that attribute indicates the actual result obtained for the sample in question in that test. In the present scenario, attributes represent genetic test results and the attribute values indicate genetic data indicative of genetic make-up of the sample material. For example, the attribute set may represent a partial (or possibly even complete) genome sequence, with the attribute values specifying individual elements of the sequence. Since the resulting attribute set can be extremely large, preferred embodiments can employ an elegant and highly efficient technique for encoding attributes as prime numbers in cryptographic credentials. The basic technique is described in detail in "Efficient Attributes for Anonymous Credentials", J. Camenisch and T. Gross, ACM Computer and Communications Security (CCS), 2008, pp. 345-356, ACM Press, November 2008, and our copending U.S. patent application Ser. No. 12/548,699, US Patent Application Publication Number 2010/0115281, the relevant contents of which documents are incorporated herein by reference. Briefly, all attribute values are prime numbers, and the attribute value assigned to a particular result is selected in accordance with a predetermined mapping of results to prime numbers. The entire set of test results, i.e. the set of attribute values $\{m_i\}$, can then be encoded in a cryptographic credential by encoding the product P of all the prime attribute values $\{m_i\}$ in the credential. Thus, test results (attributes values) are effectively encoded as prime factors of the product P encoded in the cryptographic credential. The prime property of the encoded attributes ensures that individual attributes can always be distinguished. This system allows all attributes to be encoded in an elegantly simple and exceptionally efficient manner. In addition, as detailed in our aforementioned patent applications, this system provides the basis for highly efficient proofs in subsequent use of the credential as discussed further below.

In the present case, the attribute set is initially encoded in a cryptographic pre-credential σ'. The pre-credential σ' is generated by analyzer 5 in step 2(d) and encodes both the attribute set (e.g. as the product P of primes discussed above) and the commitment C for the sample. The pre-credential can be generated as an anonymous "hidden signature", or "pre-signature", under a secret key $sk_G$ of analyzer 5:

σ'ρHiddenSign(C, P; $sk_G$)

The pre-credential σ' is generated such that such that subsequent completion of the pre-credential (to obtain a complete, usable credential σ as described below) requires knowledge of the secret value (r) in the commitment C. In more detail, the pre-signature σ' is generated by choosing a random prime e, a random integer v", computing $$Q := \frac{Z}{Ch^{v^n} g_i^{m_i}} \pmod{n}$$

and determining A as $Q^{(e^1 \mod p'q')} \mod n$.

The per-signature σ' is (A, e, v'').

Having generated the pre-credential σ' corresponding to sample identifier s, in step 2(*e*) of FIG. 3 the analyzer 5 further generates a cryptographic encryption E encoding the analysis results using a public key $pk_U$ corresponding to a secret key of user 2, conveniently the user's secret master key $m_0$. (This public key might be generated in a variety of ways for use in the system. For example, the key could be freshly generated and transferred in generally known manner for the transaction. Alternatively, for example, the key may be linked to the user's secret master key in the initial proof $\sqrt{}_1$ of FIG. 2). In particular, analyzer 5 verifiably encrypts the attribute set ("att"={$m_i | 1 \le i \le N$}) under $pk_U$ in E(att; $pk_U$). Next, in step 2(*f*), the analyzer 5 generates a signature proof of knowledge $\sqrt{}_2$ of representation of the encryption E and equality of the attribute set att encoded in encryption E with the attributes encoded in the pre-credential σ':

$\sqrt{}_2 \rho SPK\{$(att, σ', s): verifyEnc(E, att, $pk_U$), VerifySign(σ', P, s)$\}$.

In step 2(*g*) analyzer 5 destroys the physical sample, securely deletes all data, and then outputs to sample provider 4 in step 3:

Γρ(σ', E, $\sqrt{}_2$, s)

Thus, the pre-credential σ', along with encryption E and proof of knowledge $\sqrt{}_2$ corresponding to the sample identifier s are returned to the service provider 4. In step 4, service provider 4 hosts Γ, referenced by sample identifier s, awaiting a request for analysis results for the sample identifier in question. This completes the second stage of the analysis process.

Note that the independence of service provider 4 and analyzer 5 in this embodiment means that analyzer 5 is effectively a "black box" entity. Service provider 4 simply submits a sealed sample container with identifier s (and the associated cryptographic functions described above) to analyzer 5 and subsequently receives the cryptographic function Γ for the sample identifier s. The service provider 4 never has direct access to the sample or the analysis results. Similarly, analyzer 5 is removed from all contact with user 2.

Figure 4:
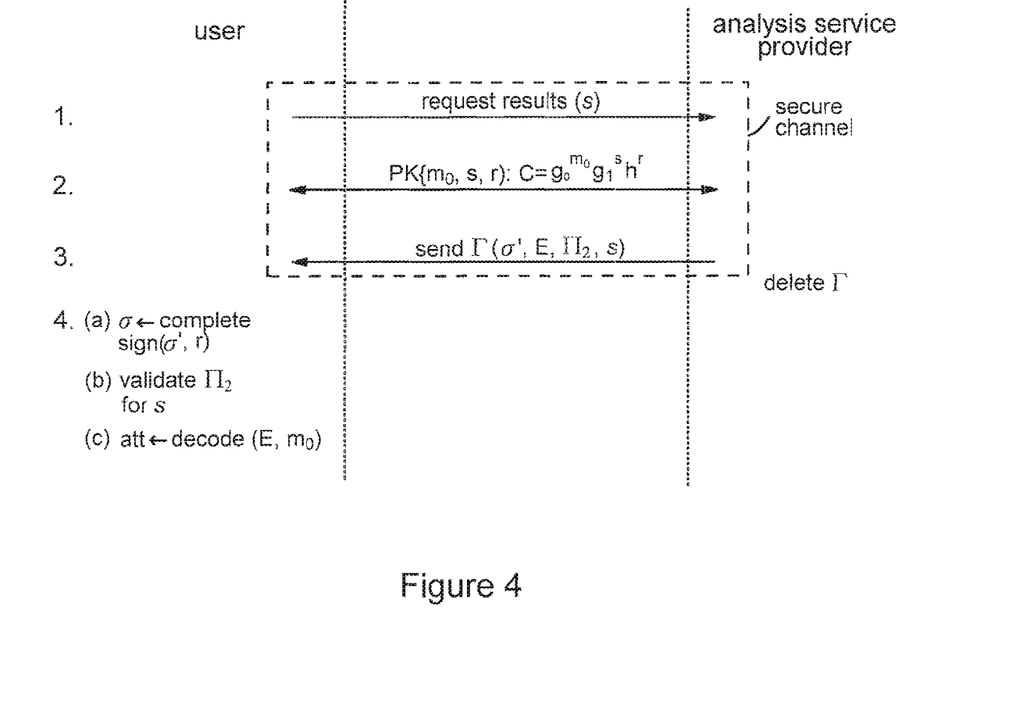
FIG. 4 illustrates interaction between the user and analysis service provider in providing the analysis results to the user.

The final stage in the analysis process involves retrieval by the user 2 of the analysis results from sample provider 4. FIG. 4 indicates the interaction during this stage between user 2 on the left of the figure and service provider 4 on the right. User 2 initially connects to the service provider's web site and sets up a secure, server-authenticated and anonymous channel, e.g. via the TLS (Transport Layer Security) protocol, in known manner. In step (1) of the FIG. 4 process, user 2 requests the results of analysis for the sample identifier s for his sample. User 2 anonymously proves authorization to access the results by an interactive proof of knowledge of the representation of the commitment C, and thereby the secret value r and master key $m_0$, encoded in the pre-credential σ' corresponding to the sample identifier s:

$PK\{(m_0, s, r): C = g_0^{m_0} g_1^s h^r \pmod{n}\}$

On successful proof, sample provider 4 permits download of Γ for s, thereby supplying the user with the pre-credential σ', encryption E, and signature proof $\sqrt{}_2$ for the sample identifier s. Service provider 4 then securely deletes θ.

In step 4(*a*) of FIG. 4, the user 2 completes the pre-credential σ' using the secret commitment randomness r and the public key corresponding to secret analyser key $sk_G$ to obtain a complete cryptographic credential σ encoding his analysis results. Only then is the credential operational. Completion of the pre-credential is done by computing v=r+v'' given a pre-signature σ'=(A, e, v'') and verifying the obtained signature σ=(A, e, v) with the Camenisch-Lysyanskaya verification method VerilySign( ).

In step 4(*b*) of FIG. 4, the user 2 validates the proof $\sqrt{}_2$ to verify the representation of encryption E and confirm equality of the attributes encoded in the encryption E with the attributes encoded in the credential G. Next, in step 4(*c*), the user decodes the encryption E using his secret key $m_0$ to obtain his analysis results as defined by the set of attributes (att).

By the FIG. 4 process, the user asynchronously and anonymously obtains a credential σ encoding the analysis results for his sample. The system of hosting by service provider 4, coupled with application and proof by the user, maintains unlinkability between any user identity and the user's genetic analysis results. The user (and only the genuine original user) can retrieve the correct results for his sample. The service provider cannot identify the user and cannot access the results itself since these are encoded in cryptographic functions decipherable only by the correct user.

It will be seen that the system described above provides a fully-anonymous process for provision of genetic analysis results to a user, providing end-to-end privacy protection, ensuring confidentiality of the genetic data and also unlinkability between the user's true identity (any personal identifiable information such as postal address, billing information, payment stream, etc) and the genome analysis. Offline procedural steps (mailing of test kit, payment, etc) in which the user's true identity is revealed are separated from the remainder of the procedure by cryptographic blinding and zero-knowledge proofs of knowledge. The user obtains an anonymous credential on his genetic data and can be sure of receiving the correct results, and a malicious party cannot use the sample or associated cryptographic functions to obtain results for his own purposes via the process. User consent to obtaining the credential for his results is therefore also ensured. Additional constraints on user consent can also be imposed as discussed below.

The user, possessing the credential certifying his genetic data, can use the credential to make cryptographic proofs about his genetic data. Proofs can be made without necessarily revealing the genetic data per se. The user may selectively disclose genetic information for a specific purpose (e.g. proving that the user is not subject to a specific disease, while keeping the full genome confidential). Use of the prime encoding system as discussed above provides the basis for highly efficient proofs in subsequent use of the credential. This is discussed in detail in our above-referenced European patent applications. Briefly, however, a user can prove whether the credential certifies any specific attribute, i.e. that the user does or does not possess that attribute, simply by proving that a prime number w which maps to that attribute (in accordance with the predetermined mapping of attributes to primes) does or does not divide the product P encoded in the credential, i.e. that w is or is not an integral factor of P. This elegant method can easily be applied to proofs about more than one user attribute. In particular, possession (or not) of a specified plurality of attributes can be demonstrated by proving whether the product x of respective prime numbers which encode those attributes in accordance with the aforementioned mapping divides the value P encoded in the credential. The credential can also be used to make efficient proofs as to whether an attribute encoded in the credential is a member of a given set, i.e. that the attribute is, or conversely is not, a member of that set. This is done simply by proving whether a prime number w encoded in the credential divides (i.e. is an integral factor of) the product value Q, where Q is the product of the prime numbers corresponding to the attributes in the set in accordance with the aforementioned mapping. The positive proof is made by showing the w does divide the product value Q, and the negative proof by showing that w does not divide O. The prime property of the encoded attribute values ensures that the divisibility of w into Q is determinative for the set membership proof in both cases. The user can thus use the genetic credential with third parties (e.g., hospitals, doctors, insurances, medical portals, etc.) for secondary uses without privacy infringements.

The user may also use the credential in interactions with a third party to obtain additional services based on his genome information, while proving only certain significant patterns and keeping the full genome confidential. The user may hind his genetic credential to additional, secondary credentials, e.g. by utilizing the same secret master key $m_0$ for these credentials. In particular, the user may bootstrap his raw genome credential with a third-party who issues additional secondary credentials to the user as a service (e.g., diagnosis, risk assessments, tailored pension care plans, etc.).

The user's software may allow the user to compile a readable report from the credential, either using a local database of text explanations for genetic patterns, or by interacting online with a third party (such as analysis service provider 4) and anonymously and unlinkably proving certain genetic patterns with the credential system. For example, analysis provider 4, acting in the role of a Camenisch-Lysyanskaya signer, may ultimately provide multiple credentials: the first credential certifying the raw genome as described above, with secondary credentials certifying derived conclusions. All credentials can be bound to the very same master key $m_0$ of the user.

The master key $m_0$ may be reserved for genetic information purposes only, completely separate of other identity credentials possessed by the user. Alternatively, the genetic information can be bound via the master key to other identity credentials of the user. For instance, if the user owns an electronic passport with a credential system, the user can tie the genetic information to his passport. This feature offers a mechanism to strengthen the user consent constraints on the analysis process discussed above. The user may additionally generate a proof of possession of an identity credential encoding the master key and predetermined identity data, and supply this to the service provider with the commitment. The service provider then verifies the proof, confirming possession by the user of the credential encoding that identity data and the master key encoded in the commitment. For instance, the user U can prove to service provider 4 that he indeed has a living address at the place the test kit was sent to. In step 3($d$) of FIG. 2, the proof of knowledge may additionally include proof of possession of an identity credential (IDcred) with the same master key $m_0$ as the commitment C:

$$\sqrt{_1}\rho SPK\{(m_0,s,r):C=g_0{}^{m_0}g_1{}^s h^r (\mod n). \text{VerifySign}(\text{IDcred})\}.$$

In addition, the service provider 4 may commit to the mailing address as part of the test kit shipment, and the user could then prove in zero-knowledge that his identity credential indeed contains the same address attributes as a blinded version of the mailing address commitment.

Various further changes and modifications can of course be envisaged. For example, while the sample provider is a private individual, supplying a personal sample, in the scenario above, other application scenarios can be envisaged. The sample provider might, for instance, be doctor submitting a sample on behalf of a patient. In this case, proofs such as step 3($d$) of FIG. 2 may involve proof of appropriate medical credentials in addition to the features already described.

While the above process employs an anonymous credential system based on Camenisch-Lysyanskaya signatures as a preferred implementation, other anonymous credential systems might be envisaged. Various systems can also be envisaged for issuance and use of cryptographic keys employed in the various cryptographic processes.

Embodiments of the invention might also be applied in processes involving other types of analysis than genetic analysis. In some applications, certain privacy or security features described above may be relaxed. For example, in some applications the analysis provider 3 might be implemented by a single entity, though independent entities are preferable for the reasons discussed above.

Thus, having reviewed the disclosure herein, the skilled artisan will appreciate that aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Distinct software modules for carrying aspects of embodiments of the invention can be, in at least some cases, embodied on a computer readable storage medium.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

It will be appreciated that many other changes and modifications can be made to the exemplary embodiments described above without departing from the scope of the invention.

What is claimed is:

1. A method for provision of privacy-sensitive sample analysis results, the method comprising:
   selecting, by at least one first processor, a secret value, r;
   generating, by the at least one first processor, a cryptographic commitment by encoding at least the secret value, r, and a sample identifier, s, wherein the sample identifier, s, is a sample container identifier;
   sending, by the at least one first processor, said cryptographic commitment to at least one second processor;
   obtaining, by the at least one second processor, a set of analysis results by analyzing a sample contained in the sample container;
   generating, by the at least one second processor, a cryptographic pre-credential, by encoding the set of analysis results and said cryptographic commitments;
   receiving, by the at least one second processor, a cryptographic proof of knowledge of at least said secret value, r, and a second sample identifier from the at least one first processor;
   supplying, by the at least one second processor, the cryptographic pre-credential to the at least one first processor based on the cryptographic proof of knowledge of at least said secret value, r, and the second sample identifier;
   obtaining, by the at least one first processor, a cryptographic credential based on the cryptographic pre-credential using said secret value, r; and
   obtaining, by the at least one first processor, the set of analysis results based on the cryptographic credential.

2. The method of claim 1, further comprising:
   generating, by the at least one second processor, a cryptographic encryption by encoding the set of analysis results using a public key provided by the at least one first processor, and supplying said cryptographic encryption to the at least one first processor with the pre-credential; and
   decoding, by the at least one first processor, the cryptographic encryption using a secret key to obtain the set of analysis results.

3. The method of claim 2, further comprising:
   generating, by the at least one second processor, a cryptographic proof of equality of the set of analysis results encoded in the pre-credential and in said cryptographic encryption, and supplying the proof of equality to the at least one first processor with the pre-credential; and
   verifying, by the at least one first processor, the proof of equality to confirm equality of the set of analysis results in the pre-credential and the cryptographic encryption.

4. The method of claim 1, wherein said step of generating said cryptographic commitment further includes encoding a private key of the at least one first processor.

5. The method of claim 4, wherein said private key is encoded in a cryptographic identity credential that includes encoded identity data of a sample provider.

6. The method of claim 5, further comprising:
   generating, by the at least one first processor, a proof of possession of the cryptographic identity credential, and supplying the proof of possession of the cryptographic identity credential to the at least one second processor with the cryptographic commitment; and
   verifying, by the at least one second processor, the proof of possession to confirm possession by the at least one first processor of the cryptographic identity credential and the private key.

7. The method of claim 1, wherein said cryptographic credential is an anonymous credential.

8. The method of claim 1, wherein the pre-credential encodes the set of analysis results as a product of prime numbers corresponding to respective results in said set of analysis results in accordance with a predetermined mapping of results to prime numbers.

9. The method of claim 1, further comprising:
   generating, by the at least one first processor, for the cryptographic commitment, the cryptographic proof of knowledge of said secret value, r, the cryptographic proof of knowledge further including proof of knowledge of the sample identifier, s;
   supplying, by the at least one first processor, the cryptographic proof of knowledge for the cryptographic commitment to the at least one second processor with the cryptographic commitment; and
   verifying, by the at least one second processor, the cryptographic proof of knowledge of said secret value, r, and the sample identifier, s, for the cryptographic commitment to confirm knowledge of the secret value, r, and the sample identifier, s, encoded in the commitment and to confirm equality of the sample identifier, s, encoded in the commitment and the sample identifier, s, identifying the sample container.

10. The method of claim 1, wherein the sample is a sample of genetic material and wherein, in said analyzing step, the set of analysis results comprises genetic data indicative of genetic make-up of the sample.

* * * * *